3,109,832
CONSERVING POLYOL IN THE COOKING OF POLYESTERS OF POLYBASIC ACIDS AND POLYHYDRIC ALCOHOLS IN THE ABSENCE OF SOLVENTS

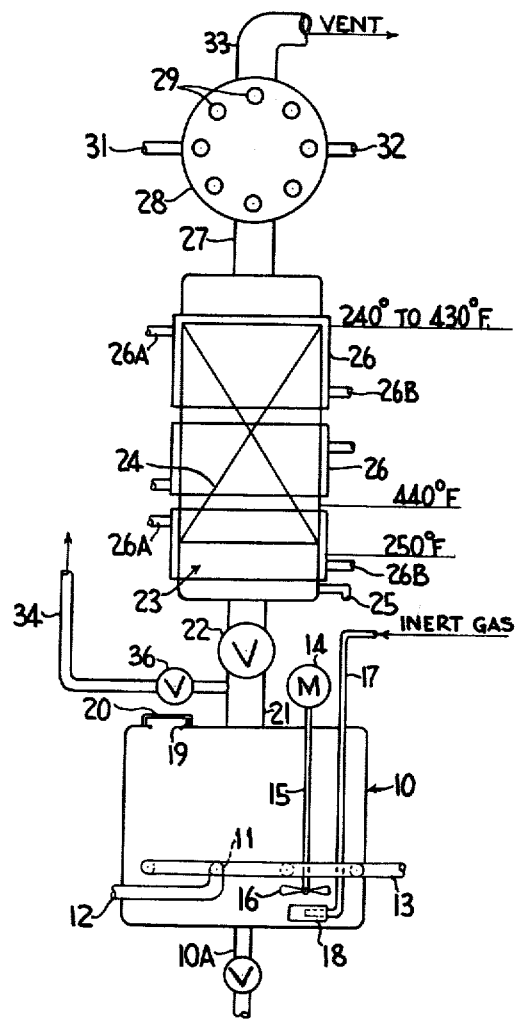

Jerome A. Seiner, Pittsburgh, Pa., assignor to Pittsburgh Plate Glass Company, Pittsburgh, Pa., a corporation of Pennsylvania
Filed Nov. 14, 1960, Ser. No. 68,989
7 Claims. (Cl. 260—75)

This invention relates to a method of preparing a polyester of a dicarboxylic acid and a polyol by fusion cook or bulk polymerization, and it has particular relation to a method of preparing such polyesters wherein the reaction time is greatly reduced and the loss of polyol component due to volatilization in the reactor is reduced or eliminated.

It has heretofore been disclosed to prepare polyesters of dicarboxylic acids, such as one of the phthalic acids or an anhydride thereof, or a mixture thereof, with an alpha, beta-ethylenically unsaturated acid, such as maleic acid (or its anhydride) or fumaric acid or itaconic acid, and a polyol such as propylene glycol, by heating the mixture to produce esterification attended by evolution of water. In the event that the anhydride of a dicarboxylic acid is employed as the source of the acid, the reaction can be regarded as proceeding in stages as follows:

(I) 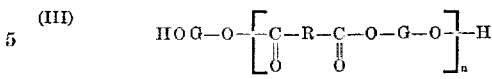

In this first stage, no water is evolved, the anhydride ring being merely split to form a partial ester in which one of the carboxyls of the acid and one of the hydroxyls of the polyol component remain unreacted. If the resultant partial ester is further heated, the terminal hydroxyl and the terminal carboxyl of contiguous molecules of acid and polyol enter into reaction to form chains, which may be approximately represented by the formula:

(II) 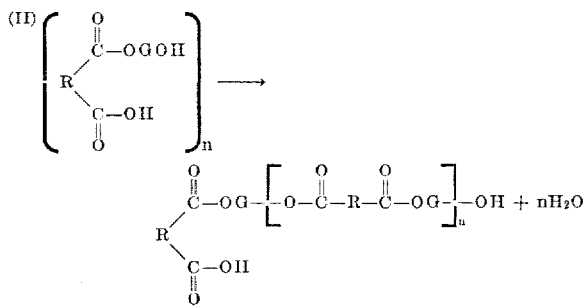

wherein R and G are respectively organic groups in a carboxylic acid and a polyol, $n$ being a number representing the number of ester units in a polyester chain. This number may vary over a relatively broad range, for example, from 1 to 500 or more. During the course of the second stage of the reaction, $n$ molecules of water are liberated. In the foregoing equation, the polyester molecule is represented as being terminated at one end by means of any carboxylic acid group and at the other by means of a hydroxyl group. This represents conditions when equal moles of ester and acid are involved in the esterification reaction. If a considerable excess of the acid or the polyol is employed in the reaction, it will be manifest that there will be a tendency to terminate the polyester molecules with the component which is used in excess. For example, if the polyol is the excess component, most of the molecules of polyester will have hydroxyl groups at both ends, as represented by the formula:

(III) 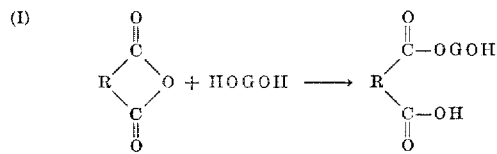

wherein R, G and $n$ have the significance previously given.

In those instances in which a free carboxylic acid, such as fumaric acid or terephthalic acid, is employed instead of the anhydride, the evolution of water in the esterification reaction begins immediately, as represented by the equation:

(IV) 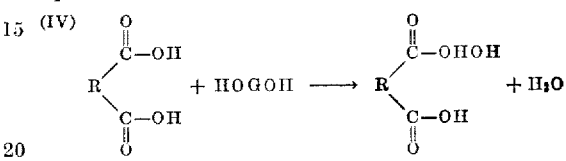

As the reaction proceeds to form chains comprising alternate acid and polyol residues, water is evolved as in the preceding equation.

Since the foregoing reactions are reversible, the water tending to hydrolyze the polyester to reform the polycarboxylic acid and the polyol, it is necessary to remove the evolved water from the reaction zone as it is formed if a reasonable degree of completion of reaction within a reasonable time is to be attained. To facilitate this removal of water, a solvent for the reactants, which is a non-solvent toward the water, has often been added (usually in small amounts). As the reaction proceeds, the solvent boils off and the vapor thereof carries away most of the water substantially as it is evolved. In conventional practice, it has heretofore been common practice to condense the vapors of water and solvent and separate the liquid phases in a suitable trap, the water being discarded and the solvent being returned to the reactor so long as appreciable amounts of water are being evolved.

This prior process has been found to be objectionable in certain respects. For example, it has been found that appreciable quantities of many of the polyols are volatilized and carried out of the reactor in the vapor mixture from the latter. The polyol thus carried away is condensed with the water of reaction in the condenser and has been discarded to the sewer. Although the concentration of the polyol in water thus discarded is low, the total amount thereof is often a substantial percentage of the polyol introduced into the reactor. If reasonably low acid values are to be attained in the polyester, it is necessary to add excess polyol to the reactor to compensate for this loss.

In addition to being wasteful of polyol, the conventional techniques of ester cooking, in spite of the fact that they do effect removal of water from the reaction zone, tend to be quite slow and therefore expensive from the standpoint of apparatus and heat requirements.

In U.S. Patent No. 2,892,813 to Wavering et al., it has been disclosed to improve the performance of the conventional esterification reaction by the provision of a column upon the reactor, which column at the top, is provided with means for supplying water, as for example, in the form of a spray in order to form an azeotropic mixture of vapors of water and solvent, the lower portion of the column being kept relatively hot in order to prevent the return of water from the column to the reaction zone. In the process of this patent, the vapors of water and solvent pass out of the column as an azeotropic mixture of relatively low boiling point, thus effectively eliminating the water from the system. Polyol, not being adapted to form an azeotrope, is condensed and passes back down through the hot portion of the column to the reactor with but little or no return of water to the latter.

In this patented process, the azeotropic mixture of water and solvent vapors from the top of the column are condensed and a resultant liquid condensate is subjected to separation into phases, one being of solvent and the other being of water. The solvent phase is returned to the reactor and such part of the water phase as is required may be put back into the top of the column to facilitate maintenance of azeotropic conditions therein. Such water as is not required to cool the top of the column and to form the azeotropic mixture is discarded, there being but little loss of polyol component therein.

In addition to conserving polyol from the reactor in the foregoing process, it has also been observed that the use of the process also results in some degree of speed-up in the reaction, thus increasing the output of the apparatus and saving on heat requirements. However, this saving in time and heat is only moderate, the esterification time still being relatively long and often extends from about 15 to about 17 hours, or even longer in certain instances.

This invention contemplates the provision of a process of forming polyesters by fusion cook or bulk polymerization and wherein the use of solvent is not required. However, the loss of polyol in vapor phase from the reactor is quite substantially reduced and concurrently, the rate of reaction is greatly speeded up, often to such degree that the esterification time is divided in half or even further reduced.

These and other advantages are attained by application of the following steps:

(A) The reaction of esterification between the polyol and the carboxylic acid is conducted in a reactor by fusion cook or bulk polymerization, that is, without the inclusion of a liquid solvent or diluent, but with a relatively rapid flow of nonreactive gas through the esterification mixture designed to sweep out water as a vapor as it is formed and thus to eliminate it from the reaction zone.

(B) The mixture of gas and vapors of water also containing some polyol vapor is passed upwardly through a column which preferably is packed with a material such as Beryl saddles, Raschig or Intalox saddles, or with bubble plates or other suitable packing material. The degree of packing may be such as to give at least one theoretical plate of separation to the column. There is no particular upper limit to the number of plates other than those arising from costs. The temperature of the lower part of the column is maintained above the boiling point of water and below the boiling point of polyol, and preferably in a range of about 280° F. to about 330° F., so that the water vapor is carried up through the column and polyol vapors, at least in part, are condensed and returned down through the packing to the esterification mixture in the reactor. The top of the column is maintained relatively warm, e.g., at a temperature above the boiling point of water and preferably between about 260° F. and about 310° F. The vapors from the top of the column are passed to a partial condenser operating under boiling conditions for water or slightly above, and preferably in a range of about 212° F. to 230° F., so that the residual vapors of polyol are condensed out and the water vapor and atmosphere and the inert gas mixture pass out and escape to the atmosphere.

(C) In the operation of the apparatus during those stages of esterification reaction wherein considerable amounts of water are being evolved, a flow of inert gas is maintained through the reaction mixture and through the column at a sufficient rate to assure that the water of reaction is adequately removed as it is formed.

In the practice of the present invention, various polyesters involving different components may be prepared. The preferred polyols are usually glycols, many of which tend to be volatile and therefore escape relatively rapidly from the reactor. This is especially true of glycols, the organic portions of which are hydrocarbon, i.e., without ether linkages. These glycols include ethylene glycol, propylene glycol, butylene glycol and the like. The ether glycols, such as diethylene glycol and dipropylene glycol, also escape to some extent, though not so much as the foregoing glycols. Other polyols which also sometimes are lost to some degree comprise triethylene glycol, tripropylene glycol and glycerine. The present system may be applied in the preparation of any of the polyesters wherein these or other polyols, singly or in admixture, are used.

Likewise, the system is applicable to the present operation of polyester using various polycarboxylic acids. The term "acids" as herein used also includes the anhydrides thereof where the latter exist. Obviously, the anhydrides are often preferred in the reaction over the free acids because they tend to react to form esters more rapidly than do the acids, and during the early ring-breaking stages do not evolve substantial amounts of water. The following are typical anhydrides which may be used in the reaction:

Maleic anhydride
Phthalic anhydride
Endomethylenetetrachlorophthalic anhydride
Tetrachlorophthalic anhydride
Tetrahydroxyphthalic anhydride
Succinic anhydride The following are some of the free acids which may be used in the reaction:

Adipic acid
Isophthalic acid
Terephthalic acid
Fumaric acid
Succinic acid

Obviously, mixtures of free acids and anhydrides, or two or more anhydrides, or two or more free acids may be used in the reaction.

In the reaction, various inert or nonreactive gases may be used to sparge the reaction mixture and thus to remove the water therefrom. Carbon dioxide constitutes one such gas. Likewise, nitrogen may be employed. Gases preferred from the standpoint of efficiency and economy comprise the combustion gases such as are obtained by burning a fuel gas or a hydrocarbon gas with air to form a mixture consisting largely of carbon dioxide and nitrogen with perhaps some carbon monoxide and minor amounts of other gaseous constituents, such as oxygen, in admixture therewith.

In conducting the reaction of esterification, it is preferred that the components be introduced into the reactor and in the event that the anhydrides of the acids are employed without substantial amounts of free acids, the use of inert gas to remove water during the initial stage of esterification may be reduced below the proportion indicated in the formulae set forth hereinbelow.

In conducting the esterification reaction through the main water-producing stages, the gas may be supplied to the reactor at such rate as will remove the water from the reaction mixture substantially as fast as it is formed. A formula useful for batches of about 300 gallons or above in determining the rate of gas flow during the main part of the reaction is as follows:

$$C.f.m. = 1 + K\ G$$

wherein c.f.m. indicates cubic feet of gas flow per minute, K is a number from 0.01 to about 0.04. In most instances, it is about 0.019. G indicates gallons of reaction mixture. Thus, for a 1000-gallon reactor, the formula indicates a flow of gas c.f.m.$= 1 + 1000 \times 0.019 = 20$ c.f.m. This rate for a 1000-gallon batch may be varied substantially, for example, by about 50 percent either way, though it is considered that the rate of about 20 cubic feet per minute is near the optimum for the specific size of batch. If the rate of flow is unduly reduced, the volume of gas will be insufficient to carry away all of the water from the reactor sufficiently rapidly. For example, if a rate of flow of 0.5 cubic feet of gas per minute be substituted for the previously given 20 cubic feet per minute, the reaction time is considerably longer due to poor water removal. There is no particular upper limit to the rate of gas flow, especially during the main cooking stage, except that it will be apparent that if an excessive gas flow is passed through the reaction mixture, there will be a tendency for the mixture to foam and there will also be an undue tendency to carry over volatile polyol component in the vapors passed from the top of the reactor. In small batches, as for example, when the reactor used is quite small, the formula may tend to break down owing to the relatively large value of the constant 1. However, even with the very small sizes of reactors, as for example, with a reactor of 10-gallon capacity, the gas flow during the main water-producing part of the reaction should seldom be reduced below about 0.5 cubic feet per minute. The flow of gas, even with very large reactors, will seldom exceed 1+0.04 G (G being gallons of batch) until most of the polyol component has at least partially reacted with the acid component, whereby to prevent volatilization of the polyol.

At the conclusion of the main reaction during which water is evolved, substantially all of the glycol is tied into the polyester and the evolution of water has slowed down or nearly ceased. The sparge rate may then be increased in order more completely to carry the reaction to completion, thoroughly to remove water from the polyester product and to obtain desired viscosity and acid number. At this stage, the gas flow for a 1000-gallon batch may be increased to about 40 to about 60 cubic feet per minute and may be carried even higher, though, of course, excessive use of sparging gas during the final stages of the reaction tends to be uneconomical.

For a better understanding of the invention, reference may now be had to the accompanying drawing in which the single FIGURE is a diagrammatical representation of apparatus suitable for use in the practice of the invention.

In the apparatus as shown, a reactor 10 is provided and may be of conventional design. It may be provided with convenient means for supplying heat, as for example, a burner supplying an open flame, or (as shown) it may be provided with an internal coil 11 having inlet and outlet connections 12 and 13 through which a heating medium, such as hot water or steam, may be circulated. A circulating medium, such as Aroclor, or a condensing medium, such as Dowtherm, may be used. A conduit 10A having an appropriate valve provides means for discharging the ester product from the reactor 10, or a dip pipe may be used to pump the ester product through an upper reactor opening.

To facilitate the agitation of the reaction mixture in the reactor and thus to promote thorough contact with the gases employed to remove water and also to promote the rapid distribution of heat through the reaction mixture, a conventional agitator comprising motor 14, shaft 15, and agitator head 16 is provided. An inlet for inert gas, such as carbon dioxide, combustion gas, nitrogen or the like, is provided as at 17 and the lower extremity thereof, which may be in the form of a distributor head 18 having numerous small outlet holes, preferably terminates below the agitator head 16 so that the bubbles of gas emitted into the reaction mixture are quickly broken up and thoroughly contacted with the mixture. A charging hole 19 is also provided in the top of the reactor and is closed, as by means of a hinged lid 20 which functions normally to prevent the escape of vapors to the atmosphere while permitting the introduction of reaction material before or during the esterification reaction.

Vapors and gases from the reactor are discharged upwardly through a large conduit 21 provided with a valve 22 whereby the conduit may be opened or closed as may be desired. The gases and vapors from the reactor are discharged upwardly into the lower portion of a column 23 having packing indicated diagrammatically at 24 in an amount providing at least one theoretical plate of separation. There is no particular upper limit upon the number of theoretical plates other than those provided by economics. The temperature in the lower portion of the column immediately above the reactor preferably is maintained in a range of about 260° F. or 280° F. to about 310° F. or 330° F. The temperature in the lower portion of the column may be observed as by means of a thermometer, pyrometer or other suitable temperature-indicating device designated at 25. The temperature throughout the column will be relatively uniform with only a slight gradation, for example, about 5 to 20 degrees between the top and the bottom of the column. The temperature in the upper portion will generally fall within a range of about 240° F. to about 320° F. The column may also be provided with a jacket formed in one, two, three or more sections 26 through which heating or cooling medium may be circulated to promote heating or cooling of the column as may be required. The jacket sections may be provided with individual inlets 26A and outlets 26B by means of which heat exchange fluid may be supplied or circulated through the sections simultaneously or selectively, as desired.

The mixture of vapors and nonreactive gas from the zone above the packing 24 are discharged upwardly through a conduit 27 to a partial condenser 28 having suitable tubes or coils 29 whereby a cooling medium, such as water or other medium, may be applied as by means of an inlet 31 and an outlet 32 for a heating or cooling medium, as may be required. The temperature of the condenser 28 is maintained at such value that the vapor mixture passing therefrom will be at a temperature sufficient to volatilize any water carried therein, for example, about 212° F. or slightly above, or even up to about 230° F. or 240° F. At these temperatures, any polyol, such as a glycol, in the vapor mixture is condensed and allowed to return to the column. It is returned to the latter in a relatively warm condition and ultimately returns to the esterification mixture in the reactor 10 while it is hot, thus effecting economies of heat. The mixture of vapors and gases are vented from the condenser to the atmosphere or to appropriate apparatus for conserving inert gas or any other materials of value in the mixture through a vent pipe as at 33. It is also possible, though not preferred, to return condensed polyol to the reactor directly through an external line (not shown) connecting the reactor to the lower portion of the partial condenser.

When substantially all of the polyol component of the esterification mixture in the reactor 10 has been combined in the polyester and, therefore, cannot be volatilized, there is no longer any necessity of passing the sparging gases from the reactor upwardly through the column 17. At this stage, the valve 22 may be closed and the gases from the reaction mixture may be vented directly to the atmosphere, for example, through a vent pipe or conduit 34, provided with a valve 36 which may be opened when the valve 22 is closed in order to permit the direct escape of the gases. Needless to say, during the stage of the esterification reaction wherein substantial amounts of water are evolved, the valve 36 is closed and the valve 22 is opened.

The apparatus as illustrated may be provided with thermometers or thermocouples, or other appropriate temperature measuring devices whereby the temperature at various points in the system may be observed in conventional manner. Pumps and other devices for promoting flow of fluids may be added. Usually the system is operated to supply heat as fast as it can be taken up in the esterification mixture in the reactor without excessive foaming action. The temperature within the column 23 will ordinarily take care of itself. It then remains merely to maintain the temperature in the partial condenser 28 within the desired limit. This may be effected by means of the circulation of the medium through the tubes 29. Often during the main part of the run, adequate temperature control within the partial condenser is obtained merely by maintenance of a supply of water in the tubes 29. As the water boils away, a proper temperature above the boiling point of water within the partial condenser is assured. Increase or decrease of the amount of water in the tubes provides a simple way of decreasing the temperature in the partial condenser.

During the early stages of the esterification reaction before a proper temperature is attained in the partial condenser by reason of the escape of hot gases and vapors from the column 23, it may be desirable to maintain the temperature of the partial condenser by circulating a fluid, such as hot water or steam, through the tubes whereby to prevent water from being condensed and returned to the top of the column 23, thus undesirably chilling the latter.

It will be recognized that inert gases from the reaction may be passed to the stack after they have passed through the condenser 28, or they may be subjected to recovery treatment, as for example, by removal of water vapor and perhaps other impurities therefrom, after which they may be reused or applied for other purposes as desired.

The following constitute examples illustrating the practice of the invention:

*Example I*

In accordance with the provisions of this example, a reaction mixture was prepared comprising equal moles of maleic anhydride and phthalic anhydride, to which were added 2.1 moles of propylene glycol. The foregoing esterification mixture in an amount of 1000 gallons, was introduced into the reactor 10 shown in the drawings, no solvent being included in the mixture; that is, the mixture was subjected to fusion cook or bulk polymerization. During the initial stage of the reaction, it will be recognized that little or no heat is supplied to the partial condenser 28 by vapors passing therethrough, and in order to prevent the possibility of water of reaction dropping down through the conduit 27 and returning to the reaction mixture, it is desirable that the condenser be preheated, as for example, by supplying a heated medium, such as hot water, Aroclor, Dowtherm, or the like, to the tubes 29. Preferably, the temperature in the partial condenser is maintained above the boiling point of water, e.g., in the range between slightly above (e.g., 1 or 2 degrees above) 212° F. and about 230° F. or 240° F., or at such temperature as will insure that the vapors remaining in the condenser after the condensation of volatilized polyol pass out through the vent pipe 33. As the reaction in the reactor attains headway and the hot gases and vapors continue to rise through the column 23 to the condenser, they will supply heat to the latter. It will be recognized that the application of external heat through the tubes 29 may then be reduced and ultimately eliminated. After this stage is attained, the partial condenser operates partially to to cool the vapors from the column. If the tubes are appropriately filled with water, the temperature in the partial condenser will be automatically maintained at a satisafctory level by the boiling of the liquid medium in the tubes.

During the initial stages of the reaction, if foaming is not encountered, the flow of nonreactive sparging gas to the reactor through the conduit 17 may be increased even to the value indicated by the foregoing formula, but during this stage, the flow can also be substantially reduced owing to the fact that during the warm-up stages, the evolution of water of reaction is not very great. At this stage in a 1000-gallon batch, the flow may be as low as about 2 cubic feet of gas per minute.

The temperature of reaction should be increased rapidly to about 200° F., at which point an exothermal rise in the reactor occurs. Sometimes, in larger batches, the application of heat may be temporarily discontinued, for example, for about 20 minutes, though this is not essential and in the instance of smaller batches, is not desirable.

It is also permissible during the early stages of the reaction to apply heat to the column 23, as for example, by means of jacket sections 26. After the column once becomes warmed up, the temperature may be allowed to adjust to and maintain its own level and generally will stay within a range of about 240° F. or 250° F. to 430° F. The preferred range at the bottom of the column is about 260° F. to about 330° F. There may be a slight gradient in temperature between the top and the bottom of the column, though this is not usually very great, being frequently within a range of about 10 or 20° F., with the hotter zone naturally being at the bottom of the column.

As the mixture of gases and vapors pass up through the column 23 to the partial condenser, they are still relatively hot, for example, well above the boiling point of water, e.g., in a range of about 240° F. to about 430° F., when they reach the partial condenser. In the latter, they are rapidly and homogeneously cooled to a point below the boiling point of the polyol contained in vapor phase in the gases, but not below the boiling point of water. Nearly all of the polyol is condensed out in the partial condenser and drops back through the conduit 27 to the column 23, where it meets the rising gas-vapor mixture and ultimately, it builds up to the point wherein it passes from the reactor back through the column and the conduit 21 to the reactor for reuse. During its descent through the column, hot gases strip out any water which may be absorbed so that the polyol, when it reaches the reactor, is hot and essentially dry. Vapors of water and the combustion gas are vented through the pipe 33.

Heat is supplied to the reactor as fast as practicable and is used up in the esterification reaction. As the reaction progresses, the temperature of the esterification mixture tends to rise. After the anhydride rings are broken, the reaction is accompanied by the evolution of substantial amounts of water which are carried away from the reaction zone in the gas stream passing through the top of the column 23.

As the esterification nears completion and nearly all of the hydroxyl groups of the polyol have been reacted into the ester product, the temperature in the reactor increases to a maximum of about 460° F. and owing to the decrease in volatile matter, such as water vapor and glycol, the temperature in the column tends to drop. This constitutes an indication that the porpylene glycol has all reacted and most of the water has evolved. During this and subsequent stages, the progress of the esterification is usually observed by checking samples of the esterification product for viscosity and acid number in well-known manner.

In one run, the reaction was continued until an acid number of 63 and a viscosity of F on the Gardner-Holdt scale in a test sample comprising 60 percent solids in monoethyl ether of ethylene glycol at 77° F. was attained. At this stage, the sparging rate was increased to 40 to 60 cubic feet of gas per minute in order to dry the product and to carry the esterification reaction to its final stages, and to obtain the desired acid number and viscosity in the final product. Since at this time there was but very little water vapor coming from the reaction mixture and but little polyol available for volatilization, it was obvious that the techniques of recovering polyol were no longer required. Therefore, the flow of gas from the reactor was switched from the column 23 directly to the atmosphere through the conduit 34. During this period of high rate of sparging, frequent checks of the acid number and viscosity of the product were made until the polyester had an acid number of 51 and a viscosity on the Gardner-Holdt scale of H. The polyesterification reaction was then essentially complete.

When the polyester was complete, it was discharged from the reactor while hot and fluid, and was cooled to about 250° F. for the addition of a monomer, such as styrene. The incorporation of monomer and the subsequent use of the resultant interpolymerizable mixture to form resins is not a feature of the present invention and need not be described in detail. However, it may be pointed out that the polyesters as obtained were of excellent color and other characteristics, adapting them for interpolymerization with monomers to form resins of high quality.

The following constitutes a log of the reaction as obtained in a typical run:

| Time in hours | Event |
|---|---|
| 0:00 | Inert gas and heat on. |
| 1:05 | Exothermal rise at 200° F., heat off. |
| 1:25 | Heat on at 315° F. |
| 5:00 | Acid value 63, viscosity F. |
| 5:05 | Sparging rate increased, vented to atmosphere. |
| 5:40 | Acid value 51, viscosity H+. |
| 6:00 | Started discharging batch. |

The esterification times in this example and by the solvent method as disclosed in the Wavering et al. patent are compared as follows:

|  | Non-solvent method | Solvent method |
|---|---|---|
| Esterification time | 6 hrs., 0 min | 10 hrs., 42 min. |

The foregoing constitutes a typical run under the provisions of the present invention. It will be manifest that the amounts of the batch may be increased or decreased to meet individual requirements of the operator. The ratio of the inert gas may be increased or decreased, for example, in a range of about 10 to about 60 cubic feet per minute for a 1000-gallon reactor.

Some polyol conservation can be attained in a fusion cooking method of forming polyesters by application of a system wherein the reaction mixture is blown with non-reactive gas to remove water, the gas-vapor mixture being passed through a packed column and water being returned to the top of the column to keep the polyol in the column. However, this system does not have the advantage of very rapid cook attained by use of the system herein disclosed, in which the gas and vapors pass out of the column without cooling below about 240° F. and without being washed with water, and the mixture is subsequently cooled in a partial condenser selectively to condense polyol vapors, and the gas and water vapors are allowed to escape while the condensed polyol is returned to the column.

For purposes of comparison of the system in which water is returned to the top of a column heated above the boiling point of water with the present system, attention is called to the following run, wherein the charge comprised:

| | Moles |
|---|---|
| Maleic anhydride | 1 |
| Phthalic anhydride | 1 |
| Propylene glycol | 2.10 |

No solvent was included in the charge. The mixture was introduced into a reactor and was heated to esterification temperature while being blown with combustion gas to remove water from the reaction mixture as it was formed. Heat was supplied as fast as it could be taken up in the reaction mixture. The bottom of the column was maintained at 300° F., while the top was maintained at a temperature of 220° F. to 230° F., and water was sprayed into the top of the column to prevent the loss of propylene glycol at a rate of 15 milliliters per minute per 70 pounds of the charge. Heating was continued in the foregoing manner until the acid value of the reaction mixture was reduced to 46.3 and a viscosity of H— was attained. The reaction time was 15 hours and 45 minutes. This was more than twice as long as the time required to attain a substantially similar stage of esterification following the techniques of this example.

It will also be apparent that various esterifiable mixtures may be reacted in the apparatus and allowing for idiosyncracies of the individual mixtures, substantially the same procedures as given in the foregoing example may be used.

*Example II*

In accordance with this example, an esterifiable mixture was prepared comprising:

| | Moles |
|---|---|
| Maleic anhydride | 10 |
| Diethylene glycol | 12 |

These components were pre-esterified to an acid value in a range of 25 to 30, and to the resultant polyester were added:

| | Moles |
|---|---|
| Phthalic anhydride | 10 |
| Propylene glycol | 8.8 |

The resultant mixture was then further esterified in the apparatus illustrated in the drawings, following the fusion cook or bulk polymerization techniques described in Example I.

In the esterification reaction, the sparging rate with inert gas was 20 cubic feet per minute and cooking was continued until a final acid number of 25 to 35 was attained.

The total time of esterification in this example and the corresponding esterification time for preparing the same polyester in like amount, but by the techniques and apparatus of the foregoing patent to Wavering et al. and using xylene as a solvent, are compared as follows:

|  | Non-solvent method | Solvent method |
|---|---|---|
| Esterification time | 10 hrs., 5 min. | 17 hrs., 25 min. |

*Example III*

In this example, an esterifiable mixture was prepared and comprised:

| | Moles |
|---|---|
| Propylene glycol | 11 |
| Isophthalic acid | 6 |
| Maleic anhydride | 4 |

A 1000-gallon quantity of this mixture was cooked in the apparatus as illustrated in the drawings, the mixture being subjected to sparging with inert gas at the rate of 20 cubic feet per minute until substantially all carboxyl groups were reacted. The rate was then increased to 40 to 60 cubic feet per minute.

The column 23 is operated under the conditions indicated in Example I, the temperature being allowed to adjust itself to the inherent characteristics of the system and falling within the ranges previously described. The partial condenser 28 is operated to maintain a temperature in the off-gases and vapors in a range slightly above the boiling point of water and below about 240° F. The reaction is continued until an acid value in a range of 17 to 32 is attained and a viscosity of T–V on the Gardner-Holdt scale at a concentration of 60 percent of polyester in the monoethyl ether of ethylene glycol is attained. This is one of the more difficult esterification reactions and some excess of glycol is required to obtain a low acid value even when the techniques of the Wavering et al. patent are used. A substantial saving in propylene glycol is obtained by using the techniques of this invention even compared with the techniques of the patent.

The comparative reaction times and requirements in excess propylene glycol using the two methods are tabulated as follows:

|  | Non-solvent method | Solvent method |
| --- | --- | --- |
| Time | 10 hrs., 30 min. | 25 hrs. |
| Excess propylene glycol used | 10 percent. | 17 to 20 percent. |

The time required using the techniques of this invention was therefore less than half that required using the former technique. The saving in excess propylene glycol was 41 to 50 percent based on the excess used in the process.

*Example IV*

In accordance with this example, an esterifiable mixture was prepared comprising:

|  | Moles |
| --- | --- |
| Phthalic anhydride | 3 |
| Maleic anhydride | 2 |
| Propylene glycol | 4.00 |
| Diethylene glycol | 1.35 |

This mixture in an amount of 1000 gallons is esterified by fusion cook in the apparatus as shown in drawings, with inert gas; namely, combustion gas, flowing into the mixture through the conduit 17 at a rate of 20 cubic feet per minute. The temperature of the partial condenser 28 is maintained in the manner previously described in order to prevent escape of polyol in the gases, while permitting water vapor to pass out of the system. When the reaction nears completion, as is evidenced by the rise in viscosity, reduction of acid number and the cessation of water to evolve, the sparge rate may be increased to 40 to 60 cubic feet per minute and the temperature may be increased to about 440° F. The esterification is continued until an acid number of 38 and a viscosity of F in a 60 percent solution of monoethyl ether of ethylene glycol is attained. The comparative times by this method and by the method of the Wavering et al. patent are compared as follows:

|  | Non-solvent method | Solvent method |
| --- | --- | --- |
| Time of reaction | 6 hrs., 20 min. | 9 hrs., 21 min. |

The apparatus and techniques disclosed in these examples may be applied to the preparation of polyesters of other polyols and other dicarboxylic acids and/or anhydrides as described herein.

Reference is made to applicant's commonly owned applications respectively entitled "Fast Cook Fusion Polyester Technique" and "Increasing the Efficiency of Esterification Reactions," filed of even date herewith and having Serial Nos. 68,988 and 68,990, respectively.

I claim:

1. A method of preparing a polymeric polyester from an esterification mixture consisting essentially of (A) at least one polyol selected from the class consisting of ethylene glycol, propylene glycol, butylene glycol, diethylene glycol, dipropylene glycol, triethylene glycol, tripropylene glycol and glycerol, and (B) at least one carbonyl compound selected from the class consisting of maleic anhydride, phthalic anhydride, endomethylenetetrachlorophthalic anhydride, tetrachlorophathalic anhydride, tetrahydrophthalic anhydride, succinic anhydride, adipic acid, isophthalic acid, terephthalic acid, fumaric acid and succinic acid, by fusion cook, which method comprises:

(1) heating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation, through said fractionating zone to said esterification mixture in the reaction zone while permitting said gas and said water vapor in the zone of partial condensation to pass out of the system without condensation of the water vapor, and (4) continuing to return said polyol from the zone of partial condensation to the zone of esterification and to pass said inert gas through the esterification mixture until evolution of water substantially ceases and said esterification mixture has been carried to the desired stage and a polymeric polyester of desired acid value and viscosity is obtained.

2. A method of preparing a polymeric polyester from an esterification mixture consisting essentially of (A) at least one polyol selected from the class consisting of ethylene glycol, propylene glycol, butylene glycol, diethylene glycol, dipropylene glycol, triethylene glycol, tripropylene glycol and glycerol, and (B) at least one carbonyl compound selected from the class consisting of maleic anhydride, phthalic anhydride, endomethylenetetrachlorophthalic anhydride, tetrachlorophthalic anhydride, tetrahydrophthalic anhydride, succinic anhydride, adipic acid, isophthalic acid, terephthalic acid, fumaric acid and succinic acid, by fusion cook, which method comprises:

(1) heating and concomitantly agitating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation through said fractionating zone to said esterification mixture in the reaction zone while permitting said gas and said water vapor in the zone of partial condensation to pass out of the system without condensation of the water vapor and (4) continuing to return said polyol from the zone of partial condensation to the zone of esterification and to pass said inert gas through the esterification mixture until evolution of water substantially ceases and said esterification mixture has been carried to the desired stage and a polymeric polyester of desired acid value and viscosity is obtained.

3. A method of preparing a polymeric polyester from an esterification mixture consisting essentially of (A) at least one polyol selected from the class consisting of ethylene glycol, propylene glycol, butylene glycol, diethylene glycol, dipropylene glycol, triethylene glycol, tripropylene glycol and glycerol, and (B) at least one carbonyl compound selected from the class consisting of maleic anhydride, phthalic anhydride, endomethylenetetrachlorophthalic anhydride, tetrachlorophthalic anhydride, tetrahydrophthalic anhydride, succinic anhydride, adipic acid, isophthalic acid, terephthalic acid, fumaric acid and succinic acid, by fusion cook, which method comprises:

(1) heating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate determined by the formula: $c.f.m. = 1 + K\ G$, wherein c.f.m. equals cubic feet of gas per minute, K is a constant having a value within a range of 0.001 to 0.04 and G is gallons of batch, to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation through said fractionating zone to said esterification mixture in the reaction zone while permitting said gas and said water vapor in the zone of partial condensation to pass out of the system without condensation of the water vapor, and (4) continuing to return said polyol from the zone of partial condensation to the esterification and to pass said inert gas through the esterification mixture until evolution of water substantially ceases and said esterification mixture has been carried to the desired stage and a polymeric polyester of desired acid value and viscosity is obtained.

4. A method of preparing a polymeric polyester from an esterification mixture consisting essentially of (A) at least one polyol selected from the class consisting of ethylene glycol, propylene glycol, butylene glycol, diethylene glycol, dipropylene glycol, triethylene glycol, tripropylene glycol and glycerol, and (B) at least one carbonyl compound selected from the class consisting of maleic anhydride, phthalic anhydride, endomethylenetetrachlorophthalic anhydride, tetrachlorophthalic anhydride, tetrahydrophthalic anhydride, succinic anhydride, adipic acid, isophthalic acid, tetraphthalic acid, fumaric acid and succinic acid, the polyol being in excess of equivalency with respect to the total of the carbonyl material in a range of about 4 percent to about 10 percent, by fusion cook, which method comprises:

(1) heating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation through said fractionating zone to said esterification mixture in the reaction zone while permitting said gas and said water vapor in the zone of partial condensation to pass out of the system without condensation of the water vapor, and (4) continuing to return said polyol from the zone of partial condensation to the esterification zone and to pass said inert gas through the esterification mixture until evolution of water substantially ceases and said esterification mixture has been carried to the desired stage and a polymeric polyester of desired acid value and viscosity is obtained.

5. A method of preparing a polymeric polyester from an esterification mixture consisting essentially of (A) at least one polyol selected from the class consisting of ethylene glycol, propylene glycol, butylene glycol, diethylene glycol, dipropylene glycol, triethylene glycol, tripropylene glycol and glycerol, and (B) a mixture of maleic anhydride and phthalic anhydride, by fusion cook, which method comprises:

(1) heating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used, the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation through said fractionating zone to said esterification mixture in the reaction zone while permitting said gas and said water vapor in the zone of partial condensation to pass out of the system without condensation of the water vapor, and (4) continuing to return said polyol from the zone of partial condensation to the zone of esterification and to pass said inert gas through the esterification mixture until evolution of water substantially ceases and said esterification mixture has been carried to the desired stage and a polymeric polyester of desired acid value and viscosity is obtained.

6. A method of preparing a polymeric polyester from an esterification mixture consisting essentially of (A) propylene glycol and (B) a mixture of maleic anhydride and phthalic anhydride, by fusion cook, which method comprises:

(1) heating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used, the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation through said fractionating zone to said esterification mixture in the reaction zone while permitting said gas and said water vapor in the zone of partial condensation to pass out of the system, and (4) continuing to return said polyol from the zone of partial condensation to the zone of esterification and to pass said inert gas through the esterification mixture until evolution of water substantially ceases and said esterification mixture has been carried to the desired stage and a polymeric polyester of desired acid value and viscosity is obtained.

7. A method of preparing a polymeric polyester from an esterification mixture consisting essentially of (A) a liquid polyhydric alcohol and (B) a dicarboxylic acid, said liquid polyhydric alcohol being in excess of 4 percent to 10 percent with respect to the dicarboxylic acid component, by fusion cook, which method comprises:

(1) heating said mixture in a reaction zone and in the substantial absence of solvents to a temperature to effect esterification reaction between components (A) and (B) to form said polymeric polyester, attended by the evolution of and evaporation of water, and also to evaporate a portion of the polyol, passing inert gas through said mixture at a rate to remove substantially all of the water as vapor as it is evolved and to take up vapors of said polyol, (2) passing the resultant gaseous mixture of inert gas, water vapor and polyol vapor through a fractionating zone, providing at least one theoretical plate of separation and the lower portion of which is maintained at a temperature in a range of about 240° F. to 440° F. while the top thereof is maintained at a temperature above 212° F. and below 430° F., and the temperature in the upper part of the zone being below that in the bottom of said zone and being below the boiling point of the polyol being used, the fractionating zone being maintained essentially free of water in liquid state, (3) passing the vapors from the fractionating zone through a separate zone of partial condensation wherein they are cooled to a temperature in a range from slightly above the boiling point of water to about 240° F. sufficiently whereby to condense out any vapors of polyol without condensing water vapor, and returning the polyol condensed in said zone of partial condensation through said fractionating zone to said esterification mixture in the reaction zone while permitting said gas and said water vapor in the zone of partial condensation to pass out of the system without condensation of the water vapor, and (4) continuing to return said polyol from the zone of partial condensation to the zone of esterification and to pass said inert gas through the esterification mixture until evolution of water substantially ceases and said esterification mixture has been carried to the desired stage and a polymeric polyester of desired acid value and viscosity is obtained.

References Cited in the file of this patent

UNITED STATES PATENTS

| | | |
|---|---|---|
| 2,892,812 | Helbing | June 30, 1959 |
| 2,892,813 | Georgian | June 30, 1959 |
| 2,973,341 | Hippe et al. | Feb. 28, 1961 |

UNITED STATES PATENT OFFICE
CERTIFICATE OF CORRECTION

Patent No. 3,109,832                      November 5, 1963

Jerome A. Seiner

It is hereby certified that error appears in the above numbered patent requiring correction and that the said Letters Patent should read as corrected below.

Column 14, line 10, for "tetraphthalic" read -- terephthalic --.

Signed and sealed this 27th day of July 1965.

(SEAL)
Attest:

ERNEST W. SWIDER
Attesting Officer

EDWARD J. BRENNER
Commissioner of Patents